United States Patent
Butterworth et al.

(10) Patent No.: US 9,195,515 B1
(45) Date of Patent: Nov. 24, 2015

(54) METHOD AND SYSTEM FOR PROCESS LOAD BALANCING

(71) Applicants: Daniel Edward Butterworth, Peyton, CO (US); Olivier Hurez-Martin, Marlborough, MA (US); Yuri Mazuritsky, Woodbridge (CA)

(72) Inventors: Daniel Edward Butterworth, Peyton, CO (US); Olivier Hurez-Martin, Marlborough, MA (US); Yuri Mazuritsky, Woodbridge (CA)

(73) Assignee: CA, Inc., New York, NY (US)

( * ) Notice: Subject to any disclaimer, the term of this patent is extended or adjusted under 35 U.S.C. 154(b) by 338 days.

(21) Appl. No.: 13/870,483

(22) Filed: Apr. 25, 2013

(51) Int. Cl.
*G06F 9/46* (2006.01)
*G06F 9/50* (2006.01)

(52) U.S. Cl.
CPC .................................... *G06F 9/5094* (2013.01)

(58) Field of Classification Search
None
See application file for complete search history.

(56) References Cited

U.S. PATENT DOCUMENTS

| | | | | |
|---|---|---|---|---|
| 8,621,248 B1 * | 12/2013 | Weber et al. | ................. | 713/300 |
| 2009/0157923 A1 * | 6/2009 | Puishys et al. | ................. | 710/104 |

OTHER PUBLICATIONS

HP, Software Product Description, HP Integrity Essentials Global Workload Manager Agent V4.1, SPD 82.39.01, p. 2, col. 2, Para. 8 (2010).

\* cited by examiner

*Primary Examiner* — Sisley Kim
(74) *Attorney, Agent, or Firm* — Baker Botts L.L.P.

(57) ABSTRACT

A method for work load balancing in a cluster of servers including steps of: detecting a processing job that is ready to be executed; determining whether an insensitivity value is specified; determining a first server with a highest power rating from a plurality of servers; in response to determining that an insensitivity value is specified: determining a second server with a second highest power rating from the plurality of servers; determining whether a difference between the highest power rating of the first server and the second highest power rating of the second sever is less than a percentage indicated by the insensitivity value and whether the first server was selected to execute a most recent processing job. If so, the method includes the step of selecting the second server to execute the processing job. Further, a method for heuristic load balancing based on historic performance and load statistics.

9 Claims, 5 Drawing Sheets

FIG. 3    Job Scheduling Process
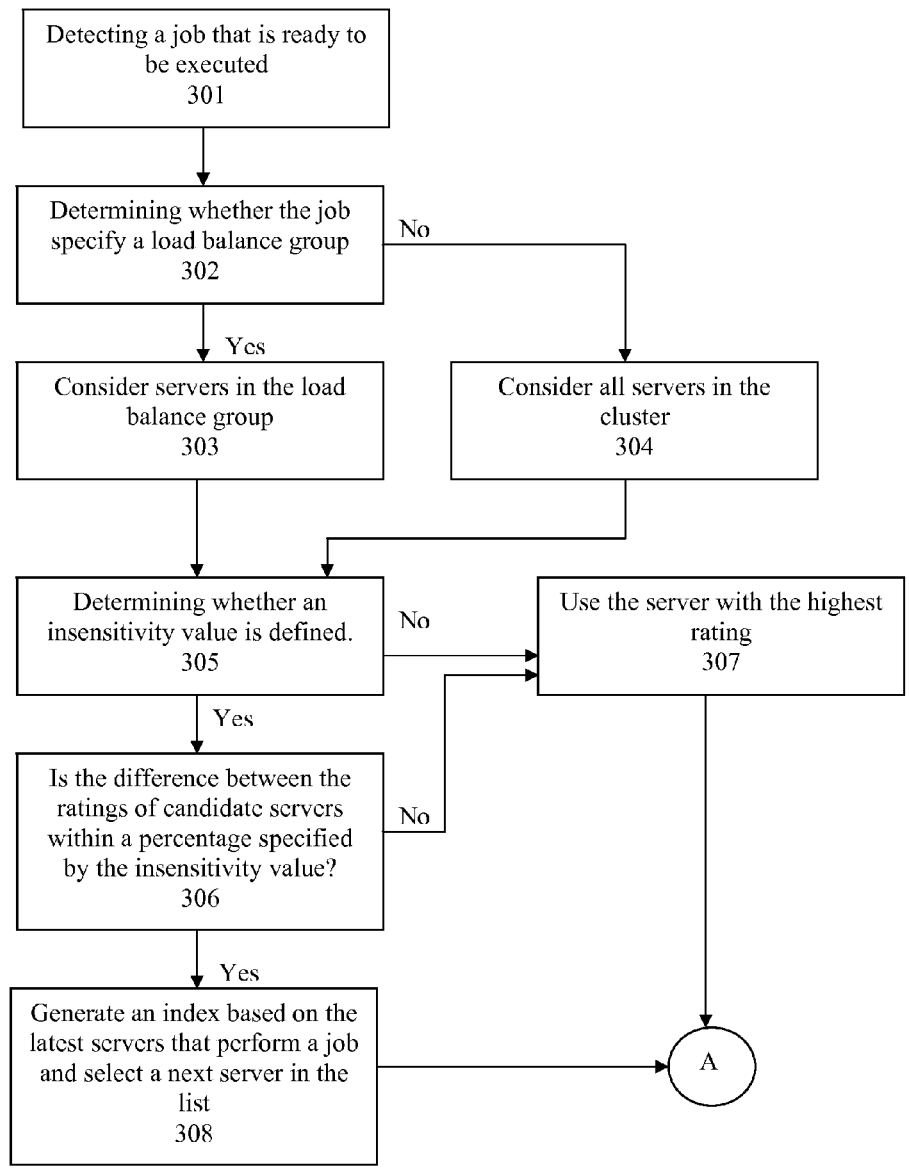

FIG. 4           Job Load Rating Determining Process
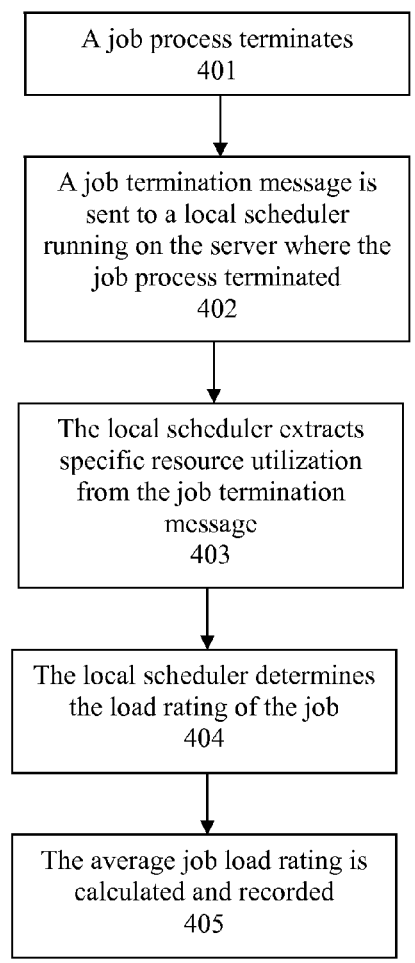

METHOD AND SYSTEM FOR PROCESS LOAD BALANCING

BACKGROUND

The present disclosure relates generally to implementing process load balancing in a cluster of servers.

BRIEF SUMMARY

The present disclosure relates generally to methods or systems for implementing process load balancing in a cluster of servers.

According to an embodiment of the disclosure, a method including steps of: detecting a processing job that is ready to be executed; determining whether an insensitivity value is specified; determining a first server with a highest power rating from a plurality of servers. In response to determining that an insensitivity value is specified: the method includes the steps of determining a second server with a second highest power rating from the plurality of servers; determining whether a difference between the highest power rating of the first server and the second highest power rating of the second sever is less than a percentage indicated by the insensitivity value; determining whether the first server was selected to execute a most recent processing job; and in response to determining that the first server was selected to execute a most recent processing job and that a difference between the highest power rating of the first server and the second highest power rating of the second server is less than a percentage indicated by the insensitivity value, selecting the second server to execute the processing job.

According to another embodiment of the disclosure, a method including the steps of: determining whether a processing job has a load rating; in response to determining that the processing job has a load rating, updating a power rating of a server, to which the processing job is to be assigned, based on the load rating of the processing job; and scheduling the processing job for the server after updating the power rating of the server.

According to still another embodiment of the disclosure, a method including the steps of: receiving a job termination message indicating that a processing job is terminated; extracting resource utilization parameters from the job termination message; receiving user instructions for setting weightings for the utilization parameters; determining a load rating of the processing job based on the utilization parameters and the weightings for the utilization parameters; and storing and associating the load rating with the processing job in a processing job storage.

BRIEF DESCRIPTION OF THE DRAWINGS

Aspects of the present disclosure are illustrated by way of example and are not limited by the accompanying figures with like references indicating like elements.

FIG. 4 a flowchart depicting a job load rating determining process according to an embodiment of the disclosure.

DETAILED DESCRIPTION

Figure 1:
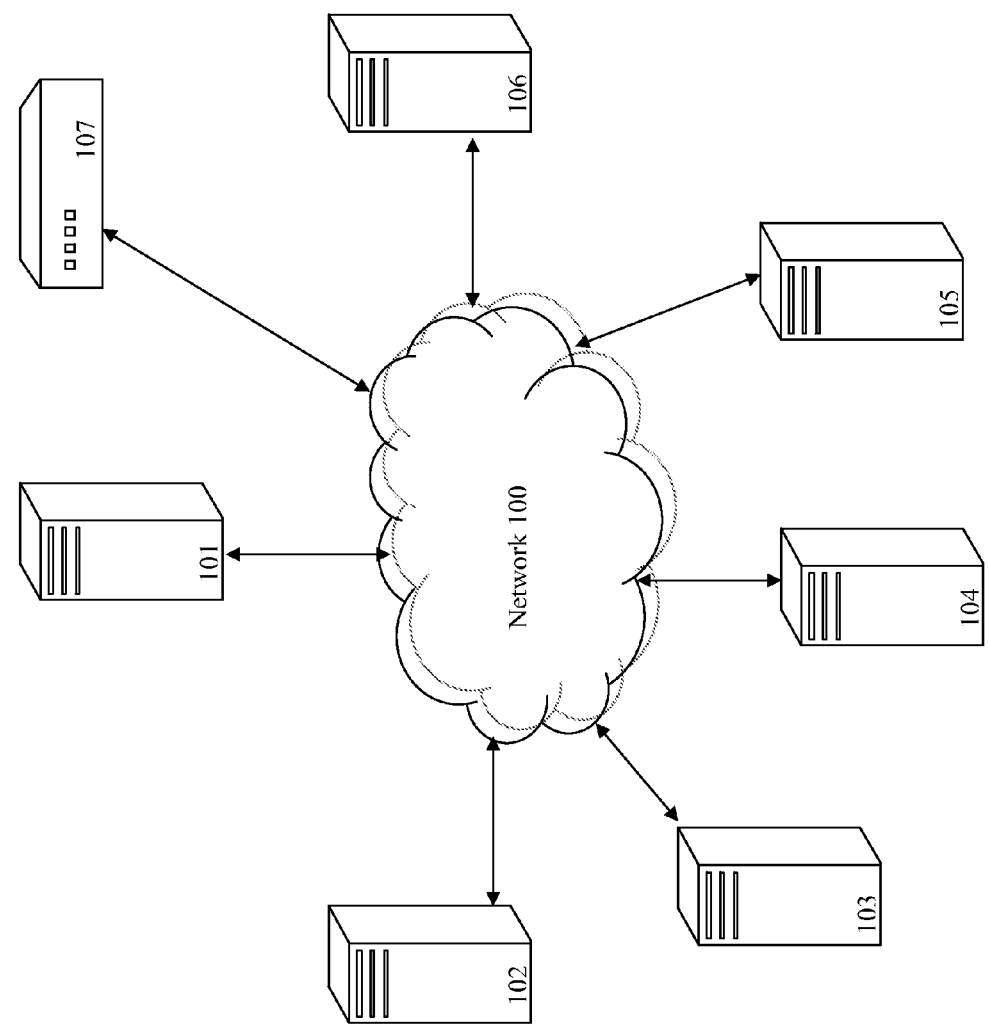
FIG. 1 is a diagram depicting a cluster of servers connected in a network according to an embodiment of the disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA®, SCALA®, SMALLTALK®, EIFFEL®, JADE®, EMERALD®, C++, C#, VB.NET, PYTHON®, JAVASCRIPT® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY®, Groovy, JAVASCRIPT®, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable storage medium that when executed can direct a computer, other programmable data processing apparatus, or other devices to function in a particular manner, such that the instructions when stored in the computer readable storage medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring to FIG. 1, a cluster of servers 101-106 may be connected in network 100. Each servers 101-106 may include a processor configured to execute various processing jobs. The processing jobs may be computer readable algorithms or programs, such as computer applications. The cluster of servers 101-106 may run a mainframe-oriented operating system, such as an Open Virtual Memory System ("OpenVMS"). The OpenVMS may be a multi-user, multiprocessing virtual memory-based operating system. Thus, processing jobs may be distributed among the cluster of servers 101-106.

The cluster of servers 101-106 may implement a workload management application to perform load balancing methods that may balance the workloads among the cluster of servers 101-106. For example, each servers 101-106 may have a power rating and a workload balancing method may be performed based on the power ratings of server 101-106. The power rating may be an integer value that indicates a processing power of the server. For example, the power rating may be derived from the processing power of the central processing unit ("CPU"), available processing member, e.g., Random Access Memory ("RAM"), available processing time, and the like. Each servers 101-106, e.g., nodes, may calculate its initial power rating during initialization.

Each servers 101-106 in the cluster may perform some number of processing jobs as assigned by a user. Further, each servers 101-106 may have information regarding the number jobs being executed in the cluster. The power rating of each servers 101-106 may be updated based on a current number of processing jobs being executed by the server. For example, a server that is executing an increased number of processing jobs may have a reduced power rating. Each of servers 101-106 may update its own power rating. For example, each of servers 101-106 may adjust its own power rating based on its current workload, e.g., number and intensity of processing jobs being executed at the server. A server may adjust its power rating when certain events occur, such as when the server begins to execute a processing job, when a processing job terminates, or periodically at a fixed time interval.

One of servers 101-106 may be designated to be a default scheduling node. The default scheduling node may connect to a job database 107 and may assign processing jobs from job database 107 to a server, e.g., a node, in the cluster based on the power ratings of the servers in the cluster. For example, a server with a top power rating may be selected to execute a new processing job.

Certain servers in the cluster may belong to a load balance group. Certain processing jobs may be designated for the load balance group and may be assigned to the load balance group. If a processing job is assigned to the load balance group, the default scheduling node may compare the power ratings of the servers in the load balance group and assign the processing job to a server with a top power rating within the load balance group.

When there are multiple processing jobs starting at the same time, the default scheduling node may assign all of these multiple processing jobs to the same server that has the top power rating. Because the server does not have the opportunity to update its own power rating, the server may be overloaded and the workload may not be properly balanced among all servers in the cluster. Further, the default scheduling node also may not have information regarding how much load a particular processing job places on a server.

The present disclosure may provide a system and method for effective load balancing in a cluster of servers even when multiple processing jobs start at the same time. Further, a method and system may be provided to determine how much load a particular processing job places on a server. In addition, processing job resource usages may be monitored and tracked to determine the load a job places on the system.

Figure 2:
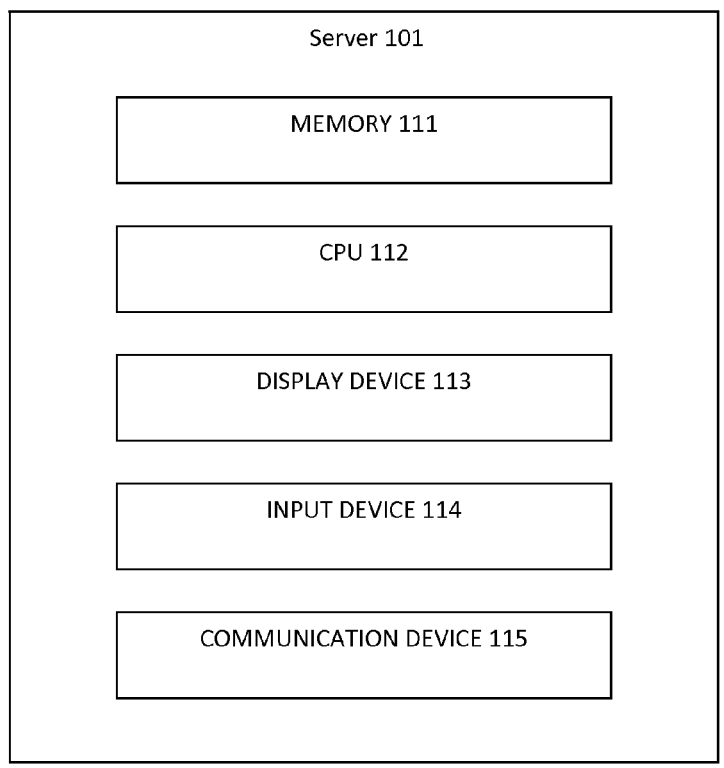
FIG. 2 is a schematic representation of a server according to an embodiment of the disclosure.

Referring to FIG. 2, server 101 may include a memory 111 and a central processing unit ("CPU") 112. Memory 111 may store computer readable programs or instructions, that when executed by CPU 112, controls server 101 to perform respective processes. For example, memory 111 may store computer readable programs for performing a job scheduling process or a job load rating determining process. Server 101 may include a display device 113, e.g., a computer screen, a touch screen, a projector, or the like. Display device 113 may receive instructions from CPU 112 to display various information. For example, display device 113 may display status and results of various processing jobs. Display device 113 also may display menus for receiving user instructions. Further, server 101 may include an input device 114, e.g., a keyboard, a mouse, a touch screen, or the like, that may receive user instructions or inputs. Server 101 also may include a communication device 115 that may send and receive data to and from other devices by wired communication, e.g., Ethernet, USB cable, or the like, or wireless communication, e.g., WiFi, Bluetooth, cellular, or the like. For example, CPU 112 may control communication device 115 to send processing job status to other servers in network 100. CPU 112 may control and facilitate the operations of the aforementioned devices. The other servers 102-106 may include similar components as server 101.

Referring to FIG. 4, a job load rating determining process may be executed by servers 101-106. For example, after executing a processing job, server 101, at step 401, server 101 may determine that the processing job has terminated. At step 402, when the processing job has terminated, a job termination message may be sent to a local scheduler of server 101 where the processing job has terminated. For example, CPU 112 may function as the local scheduler. The job termination message may be a standard format message supplied by the operating system of the cluster of servers.

At step 403, the local scheduler of server 101 may extract specific resource utilization parameters from the job termination message. For example, the resource utilization parameters may include a central processing unit (CPU) utilization, a memory utilization, an I/O utilization, and the like. The local scheduler may calculate a load rating of the processing job based on these parameters at step 404. Further, server 101 may allow a user to input and adjust a weighting for each of the parameters. Based on user adjustments of the weightings, each parameters may be weighted differently for calculating the load rating of the processing job. For example, when the servers have relatively limited CPU processing capability, the user may wish to increase the weighting of the CPU utilization parameter, such that load ratings of processing jobs may be more sensitive to CPU utilization.

Job database 107 may store a load rating history of respective proceeding jobs. An average load rating may be determined for each processing jobs based on the load rating history of the respective processing jobs. The average load rating of each processing job may be updated periodically. For example, an average load rating of a processing job may be an average of load ratings calculated over a period of time interval.

The time interval by which the average load rating is calculated may be specified by a user. For example, a user may specify that the average load rating of a processing job is calculated over a time interval of a week. An average load rating may be calculated for a processing job periodically over a user specified time interval. In another embodiment, the average load rating for a processing job may be calculated at specific beginning and ending dates. In still another embodiment, the average load rating for a processing job may be calculated after a specified number of executions. At step 405, the calculated average load ratings may be stored in job database 107. Work load schedulers may use the calculated average load ratings of the processing jobs to perform load balancing methods. Thus, an average load rating of a processing jobs may indicate the processing load the processing job places on a server.

Figure 3:
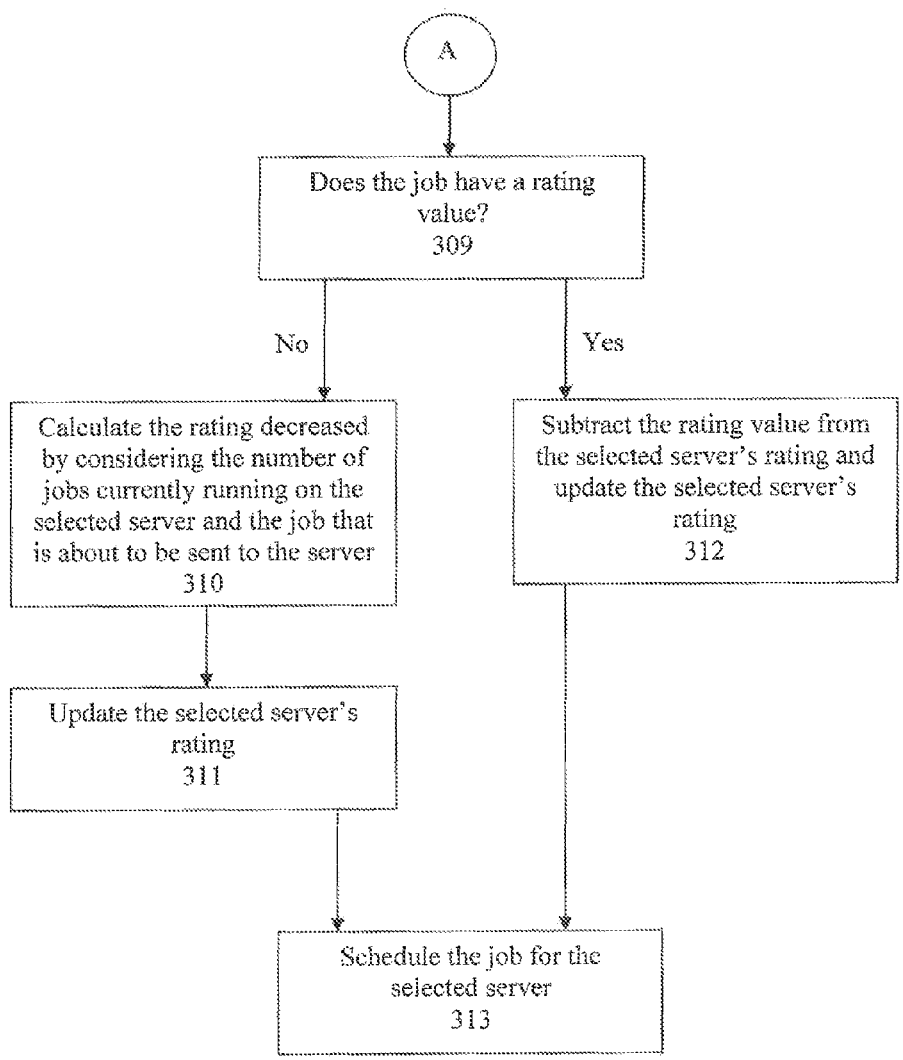
FIG. 3 is a flowchart depicting a job scheduling process according to an embodiment of the disclosure.

Referring to FIG. 3, a job scheduling process may be executed by server 101 when server 101 is designated as the default scheduling node. At step 301, server 101 may detect that a processing job is ready to be executed. For example, job database 107 may store a plurality of processing jobs and their respective starting time. Server 101 may be connected to job database 107 and may determine when a processing job is ready to be executed based on the starting time of the processing job.

At step 302, server 101 may determine whether the processing job is designated for a load balance group in the cluster. For example, job database 107 may store information regarding a load balance group in which the job is to be executed. If a load balance group is specified for the processing job, server 101 may consider servers in the specified load balance group at step 303. For example, server 101 may obtain and compare the power ratings of the servers in the load balance group, but not the other servers in the cluster. Server 101 may compile a power rating ranking list of servers in the load balance group.

On the other hand, if a load balance group is not specified for the processing job, server 101 may consider all servers in the cluster at step 304. For example, server 101 may obtain and compare the power ratings of all servers in the cluster. Server 101 may compile a power rating ranking of all servers in the cluster.

At step 305, server 101 may determine whether an insensitivity value is defined. The insensitivity value may be a percentage. The insensitivity value may be adjusted or set by a user. If no insensitivity value is defined, at step 307, server 101 may select a server with the highest power rating from the load balance group or from the cluster. If an insensitivity value is defined, at step 306, server 101 may compare the top power ratings of the servers to determine whether the difference between the top power ratings, e.g., top two or three power ratings, is within a percentage specified by the insensitivity value. For exampled, server 102 may have a power rating of 1000, server 103 may have a power rating of 1030, and server 104 may have a power rating of 1045. If the insensitivity percentage is set to 5%, servers 102-104 may be considered to have the same power ratings, because the difference between servers 102-104's power ratings is less than 5%, e.g., 50 out of 1000.

If the difference between the top power ratings is not within a percentage specified by the insensitivity value, at step 307, server 101 may select a server with the highest power rating from the load balance group or from the cluster for executing the processing job. If the difference between the top power ratings is within a percentage specified by the insensitivity value, at step 308, server 101 may consider the servers with the top power ratings for the processing job. Server 101 may determine the server that most recently accepted a processing job. For example, server 101 may determine an index listing servers recently accepted a processing job, starting from the server most recently accepted a processing job. Server 101 may skip the server most recently accepted a processing job and select a next server in the index. Thus, when server 101 assigns multiple processing jobs at the same time, the multiple processing jobs are not assigned to the same server with the highest power rating. Rather, if a server with the highest power rating is the server most recently was assigned a proceeding job, the server with the highest power rating may be skipped over, and a next server with a power rating within the sensitivity value range may be selected. Thus, the server with the highest power rating may not be overloaded by the multiple processing jobs that start at the same time. Accordingly, by using the insensitivity value, the work balancing method may avoid overloading a server that has the top power rating.

The step of adjusting a power rating of a server may be performed in at least two different methods: a heuristic load balancing method and a proportional load balancing method. Either of the methods may be selected by the user. The server, which is selected by server 101 to perform the processing job, may adjust its own power rating by using one of the heuristic load balancing method and a proportional load balancing method.

If server 102 is selected to perform the processing job, at step 309, server 102 may determine whether the processing job has a load rating. For example, job database 107 may store an average load rating for the processing job, e.g., step 405. The average load rating of the processing job may indicate an amount of processing load the processing job may place on a server executing the processing job. If server 102 determines that the processing job has an average load rating, at step 312, server 102 may perform a heuristic load balancing method to adjust its power rating.

In the heuristic load balancing method, the amount the power rating of a server is adjusted may be a scalar value representing a load that a processing job places on the server. As noted in steps 401-405, when a processing job terminates, the load rating of the processing job may be calculated using average performance parameters, such as average CPU time, average memory used, and average I/O utilization. Other performance parameters, such as a number of page faults (hard and/or soft), may also be used for load rating calculation.

In the heuristic load balancing method, the power rating of a server may be calculated using the following input parameters:

POWER RATING=MAX (0,CALC_RATING−LOAD_VALUE).

The MAX function may ensure that the power rating is equal to or greater than zero. CALC_RATING may be the power rating of a server as calculated based on its CPU power, available CPU time, available memory, or the like. LOAD_VALUE may be the calculated load rating of a processing job.

For example, server 102 may subtract its power rating by the average load rating of the processing job, e.g., 1000 (power rating of the server)−48 (load rating value of the processing job)=952 (updated power rating of the server). Thus, server 102 may update its own power rating when a processing job is about to be assigned to server 102. Accordingly, the power rating of server 102 may be reduced based on the load rating of the processing job before server 102 begins to execute the processing job.

If server 102 determines that the processing job has no load rating, at step 310, server 102 may perform a proportional load balancing method. In the proportional load balancing method, the power rating may be calculated based on the number of processing jobs currently are being executed by server 102 and the processing job which server 102 is about to execute.

In the proportional load balancing method, the power rating of a server may be calculated using the following input parameters:

POWER RATING=CALC_RATING−CALC_RATING/(JOBMAX−JOBCOUNT)*PEND_COUNT

CALC_RATING may be the power rating of a server as calculated based on its CPU power, available CPU time, available memory, or the like. JOBMAX may be the maximum number of processing jobs that a server may run. JOBCOUNT may be the number of processing jobs currently being executed by a server. JOBMAX may not be equal to JOBCOUNT such that a divide-by-zero condition may be avoided. Thus, for example, a server, which is running the maximum number of processing jobs allowed for the server, may have a power rating of zero. When no historical information is stored in job database 107 for a new processing job, the proportional load balancing method may be used for the new processing job.

At step 311, the power rating of the selected server may be updated based on the load rating value calculated at step 310. At step 313, server 101 may schedule the processing job for the selected server 313. Thus, the power rating of the selected server may be updated before the processing job is scheduled for the selected server. By updating the power rating of the selected before the processing job is scheduled for the selected server, load balancing among the servers in the cluster may be more effective.

A user may assign an initial load value to a new processing job. Further, a user may choose to switch between the heuristic load balancing method and the proportional load balancing method. Controls also may be provided for a user to clear a load rating of a processing job or historical performance parameters of a processing job. A user also may set a fixed value for a load rating of a processing job and keep the fixed load rating static.

Accordingly, by using one of the heuristic load balancing method and the proportional load balancing method, the power ratings reflecting the processing capabilities of servers 101-106 may be determined. In particular, the power ratings of a server may be adjusted based on a load rating of a processing job before the server receives the processing job and begins to execute the processing job.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
    detecting a processing job that is ready to be executed;
    determining whether an insensitivity value is specified as a non-zero positive number;
    determining a first server with a highest power rating from a plurality of servers; and in response to determining that an insensitivity value is specified:
   determining a second server with a second highest power rating from the plurality of servers;
   determining whether a difference between the highest power rating of the first server and the second highest power rating of the second sever is less than a percentage indicated by the insensitivity value;
   determining whether the first server was selected to execute a most recent processing job;
   if it is determined that the first server was selected to execute a most recent processing job and that the difference between the highest power rating of the first server and the second highest power rating of the second server is less than the percentage indicated by the insensitivity value, selecting the second server to execute the processing job; and
   if it is determined that the difference between the highest power rating of the first server and the second highest power rating of the second server is more than the percentage indicated by the insensitivity value, selecting the first server with the highest power rating to execute the processing job.

2. The method according to claim 1, further comprising:
in response to determining that an insensitivity value is not specified, selecting the first server with the highest power rating to execute the processing job.

3. The method according to claim 1, further comprising:
in response to determining that the first server was selected for a most recent processing job, selecting the first server with the highest power rating to execute the processing job.

4. The method according to claim 1, further comprising:
determining whether the processing job is specified for a load balance group; and
in response to determining whether the processing job is specified for a load balance group, designating servers in the load balance group as the plurality of servers from which the first and the second servers are selected.

5. A system comprising:
a processor; and
a computer-readable storage medium storing computer-readable instructions, which when executed by the processor, cause the processor to perform:
   detecting a processing job that is ready to be executed;
   determining whether an insensitivity value is specified as a non-zero positive number;
   determining a first server with a highest power rating from a plurality of servers; and
   in response to determining that an insensitivity value is specified:
      determining a second server with a second highest power rating from the plurality of servers;
      determining whether a difference between the highest power rating of the first server and the second highest power rating of the second sever is less than a percentage indicated by the insensitivity value;
      determining whether the first server was selected to execute a most recent processing job;
      if it is determined that the first server was selected to execute a most recent processing job and that the difference between the highest power rating of the first server and the second highest power rating of the second server is less than the percentage indicated by the insensitivity value, selecting the second server to execute the processing job; and
      if it is determined that the difference between the highest power rating of the first server and the second highest power rating of the second server is more than the percentage indicated by the insensitivity value, selecting the first server with the highest power rating to execute the processing job.

6. The system according to claim 5, wherein the computer-readable instructions, which when executed by the processor, cause the processor to further perform:
in response to determining that an insensitivity value is not specified, selecting the first server with the highest power rating to execute the processing job.

7. The system according to claim 5, wherein the computer-readable instructions, which when executed by the processor, cause the processor to further perform:
in response to determining that the first server was selected for a most recent processing job, selecting the first server with the highest power rating to execute the processing job.

8. The system according to claim 5, wherein the computer-readable instructions, which when executed by the processor, cause the processor to further perform:
determining whether the processing job is specified for a load balance group; and
in response to determining whether the processing job is specified for a load balance group, designating servers in the load balance group as the plurality of servers from which the first and the second servers are selected.

9. A computer program product comprising:
a computer readable storage medium having computer readable program code embodied therewith, the computer readable program code comprising:
computer readable program code configured to detect a processing job that is ready to be executed;
computer-readable program code configured to determine whether an insensitivity value is specified as a non-zero positive number;
computer-readable program code configured to determine a first server with a highest power rating from a plurality of servers; and
computer-readable program code configured to, in response to determining that an insensitivity value is specified:
   determining a second server with a second highest power rating from the plurality of servers;
   determining whether a difference between the highest power rating of the first server and the second highest power rating of the second sever is less than a percentage indicated by the insensitivity value;
   determining whether the first server was selected to execute a most recent processing job;
   if it is determined that the first server was selected to execute a most recent processing job and that the difference between the highest power rating of the first server and the second highest power rating of the second server is less than the percentage indicated by the insensitivity value, selecting the second server to execute the processing job; and
   if it is determined that the difference between the highest power rating of the first server and the second highest power rating of the second server is more than the percentage indicated by the insensitivity value, selecting the first server with the highest power rating to execute the processing job.

* * * * *